(12) United States Patent
Lambert

(10) Patent No.: US 6,538,232 B2
(45) Date of Patent: Mar. 25, 2003

(54) LASER PROCESSOR WITH SCAVENGING OF OPTICAL ELEMENT

(75) Inventor: Martin Lambert, Fellbach (DE)

(73) Assignee: Trumpf GmbH & Company, Ditzingen (DE)

( * ) Notice: Subject to any disclaimer, the term of this patent is extended or adjusted under 35 U.S.C. 154(b) by 0 days.

(21) Appl. No.: 09/921,735

(22) Filed: Aug. 3, 2001

(65) Prior Publication Data

US 2002/0017514 A1 Feb. 14, 2002

(30) Foreign Application Priority Data

Aug. 5, 2000 (EP) .......................................... 00116937

(51) Int. Cl.⁷ .............................................. B23K 26/14
(52) U.S. Cl. .................................. 219/121.84; 359/509
(58) Field of Search ...................... 219/121.84; 359/509

(56) References Cited

U.S. PATENT DOCUMENTS

| | | | |
|---|---|---|---|
| 3,027,644 A | * 4/1962 | Piscitelli | ...................... 359/509 |
| 4,315,133 A | 2/1982 | Morgan et al. | |
| 5,115,342 A | * 5/1992 | Rowe et al. | ................. 359/509 |

FOREIGN PATENT DOCUMENTS

| | | | | |
|---|---|---|---|---|
| DE | 39 18 363 A1 | 12/1990 | | |
| EP | 0695600 A2 | 2/1996 | | |
| JP | 63-154287 A | * 6/1988 | ............ | 219/121.84 |
| JP | 2-253673 A | * 10/1990 | | |
| JP | 3-66490 A | * 3/1991 | | |
| JP | 03066490 | 3/1991 | | |
| JP | 4-41096 A | * 2/1992 | ............ | 219/121.74 |
| JP | 04305391 | 10/1992 | | |
| JP | 5-77081 A | * 3/1993 | | |
| JP | 05 077081 | 3/1993 | | |
| WO | WO 97/06918 | 2/1991 | | |

* cited by examiner

Primary Examiner—Geoffrey S. Evans
(74) Attorney, Agent, or Firm—Pepe & Hazard, LLP

(57) ABSTRACT

A laser based processing machine incorporates in the path of a laser beam (7) at least one optical element (1) which has a surface (5) situated in the path of the laser beam (7) and a scavenging medium delivery device which flushes its surface in an essentially counterflow-free fashion. The device includes a delivery element with flow nozzles about a portion of the periphery of the optional element and through which the scavenging medium flows onto the surface of the element and thereacross.

13 Claims, 3 Drawing Sheets

LASER PROCESSOR WITH SCAVENGING OF OPTICAL ELEMENT

BACKGROUND OF THE INVENTION

This invention relates to a laser-based processing machine incorporating in the path of the laser beam at least one optical element which has at least one surface situated in the path of the laser beam to be purged by a scavenging medium.

Deposits such as lint or dirt particles that accumulate on optical elements of the type described above can compromise the functionality of the entire machine. These deposits lead to an augmented absorption of the laser beam at the optical element concerned, causing the latter to heat up considerably either in spots or in its entirety. This heat build-up can change the optical properties of the optical element to an undesirable extent, and possibly result in positional deviations and/or physical changes of the guided laser beam. In extreme cases, such overheating of the optical element can even lead to its destruction.

A prior art device is disclosed in WO 97/06918 which provides for the protection of the focussing lens of a laser based processing machine by means of a circular nozzle surrounding the focussing lens. A scavenging gas can be delivered through the nozzle to clean the lens surface facing the workpiece. The scavenging gas impinges on the entire perimeter of the circular lens surface and is directed radially toward the center of the lens. From the center of the lens surface, the gas is deflected, in a direction essentially perpendicular to the surface of the lens, toward the workpiece being processed. Another patent, EP 0 695 600, describes a laser based processing machine employing mutually opposing purge gas flows intended to generate a purge-gas eddy on the surface of the focussing lens facing the workpiece. The axis of the purge gas eddy extends in a horizontal direction relative to the lens surface concerned.

Due to the flow pattern prevailing in the prior art laser based processing machine described in WO 97/06918, the scavenging or purge gas will back up in the center of the lens surface on which it impinges. In the case of the prior art design per EP 0 695 600, the eye of the purge gas eddy in which there is next to no movement is located in the central area of the lens surface which should be protected from deposits. It follows that, in the case of both of these earlier laser processing machines, the purge gas flow cannot have a cleaning effect, or only a limited one at best, in the center of the lens. This means that prior art systems are incapable of more than marginally protecting the central areas of focussing lenses from contaminating deposits, or of removing existing dirt accumulation. This is a more serious deficiency considering that the laser beams of laser based processing machines often display a Gaussian intensity distribution pattern across the beam diameter. As a result, it is that very central region of the focussing lens in laser processing machines which is exposed to laser radiation at high intensity levels, heating up to a particularly high degree when there is beam absorption due to lens contamination.

Against that background, it is the object of this invention to provide a novel laser based processing machine in which the surface of one or several optical elements situated in the path of the laser beam are effectively and reliably protected from dirt deposits, and in which preexisting deposits may be scavenged.

Another object is to provide such a laser processing machine in which the purging gas can also be used in the beam positioning chamber.

SUMMARY OF THE INVENTION

It has now been found that the foregoing and related objects may be readily attained in a laser-based processing machine having at least one optical element in the path of the laser beam. A scavenging subassembly operative to flush at least one surface of the optical element is situated adjacent the optical element to flush the surface of the optical element with a scavenging medium. The scavenging subassembly includes a scavenger delivery device having a multiplicity of openings therein located about a limited portion of the optical element and a conduit for the scavenging medium to the openings. The openings in the device deliver the scavenging medium to flush the surface of the optical element while essentially avoiding counter flow of the scavenging medium so that the surface of the optical element is flushed by the scavenger medium essentially free of any counter flow.

The scavenger delivery device has a flow capacity that permits passage of the volume of the scavenging medium necessary for flushing the corresponding surface of the optical element and is positioned at the perimeter of the surface of the optical element to be flushed. The flow volume of the scavenger medium from the scavenger delivery device extends over the portion of the surface to be flushed.

Preferably, the scavenger delivery device openings are designed as an array of nozzles with ducts which are mutually juxtaposed along the perimeter of the optical element and open outwardly toward the surface to be flushed. The nozzle ducts of the nozzle array diverge in the flow direction to create in an extended flow direction a fan-shaped flow pattern across the surface to be flushed.

The mouths of the nozzle ducts, viewed in the flow direction, are positioned at the perimeter of the surface and situated at essentially the same level relative to the surface. The nozzle ducts may have non-uniform cross sections with respect to their shape and/or size and/or they may have a uniform circular cross section.

Preferably, the nozzle ducts of the nozzle array are provided on an enclosure for these optical elements, which encircles the surface to be flushed.

In a particularly advantageous embodiment, the surface to be flushed is positioned in a gas filled positioning chamber for the laser beam and the scavenging medium employed is a gas of the type with which the beam positioning chamber is normally filled. In this embodiment, there is included a device for regulating the pressure of the scavenging medium and a device for monitoring the internal pressure of the gas filled beam positioning chamber. The monitoring device is connected to and controls the device serving to regulate the pressure of the scavenging medium.

The optical element may be a coupling mirror in a laser resonator or a deflecting surface mirror, or a focussing lens.

Due to the virtual absence of a scavenger counter flow across the scavenged surface, the creation of any backup in the flow pattern is essentially prevented so that in all surface areas of importance a scavenger flow rate is obtained that is sufficiently high to prevent dirt from accumulating and to remove existing debris.

The basic, effective cross-sectional flow volume of the scavenger medium emanating from the delivery device of the invention can extend either over only part of the surface to be purged or along the entire surface to be flushed. In either case, the cross sectional flow volume of the scavenger actually utilized for flushing the object surface is so selected as to avoid counter flow free on the object surface at least in the key area or areas to be cleansed.

In a preferred design version of the laser based processing machine of this invention, the scavenger delivery device is configured as a nozzle array with multiple nozzle ducts which terminate, side-by-side, at the perimeter of the surface of the optical element. Nozzle ducts of this type, for instance by their alignment and/or their dimensions, provide a simple way to produce the desired flow pattern of the scavenging medium on the surface of the optical element. According to the invention, it is important to always make certain that the scavenger medium impinges on the surface of the optical element concerned with as full an area of coverage and/or as uniform a flow rate as possible. Desirably, the partial scavenger volumes flowing from the individual nozzle ducts of the nozzle array at uniform flow rates to recombine on the surface of the optical element again at a uniform flow rate, thus avoiding the creation of undesirable turbulences. Circular nozzle duct cross sections are easier to manufacture, and can be simply produced by drilling.

This invention also provides for nozzle ducts to be lined up parallel to one another which, is useful when the useful when the object surface to be flushed with the scavenging medium has a rectangular contour.

A desirable, enhanced design version of this invention offers a simple approach for sealing the area of the optical element which is to be purged with the scavenging medium, from its surroundings. A seal of that nature may be needed for a variety of reasons. For one example, the enclosure of this invention can serve to prevent dirt from penetrating into the space within the path of the laser beam in which the object surface to be flushed with the scavenger medium is located. The enclosure may also be used as a simple way to accommodate the nozzle ducts of a nozzle array. In terms of its shape, it will be desirable to adapt the enclosure to the contour of the optical element surface to be purged with the scavenging medium.

The scavenger medium may be any fluid that is capable of cleaning the object surface, or protecting it against contamination, without any particular negative effect on the functionality of the machine such as any significant deterioration of the optical properties of the optical element concerned. In the case of laser-based processing machines operating with a gas filled beam positioning chamber, the present invention is particularly advantageous. Both as the scavenging medium and as the gas environment in the beam positioning chamber the preferred gas is either nitrogen or compressed air. The present invention makes it possible to use the scavenger in controlled fashion for regulating the internal pressure in the beam positioning chamber and maintaining it at the desired level, for instance by compensating for losses caused by gas leaks from the beam positioning chamber.

Generally, the optical element with the scavenger purgeable surface is a coupling mirror on a laser resonator, or a deflecting surface mirror, or a focussing lens installed in the laser-based processing machine.

BRIEF DESCRIPTION OF THE DRAWINGS

The following description will explain this invention in more detail based on design examples with the aid of schematic illustrations in which.

DETAILED DESCRIPTION OF THE PREFERRED EMBODIMENT

Figure 1:
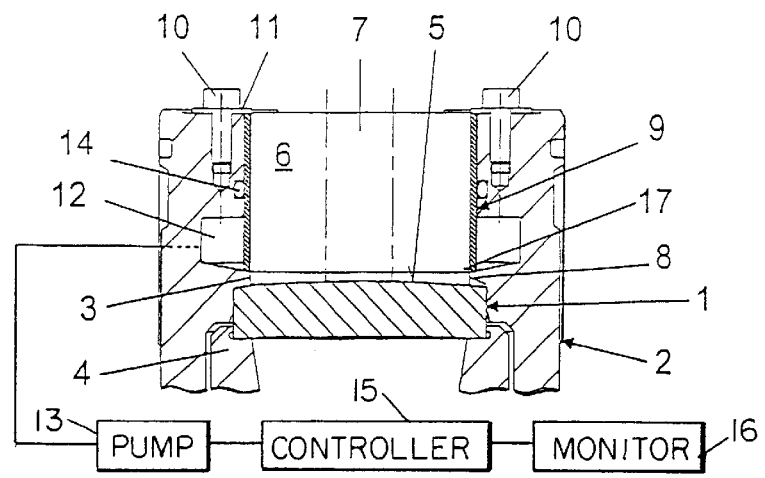
FIG. 1 shows a scavenger purgeable focussing lens in a lens mount of a laser cutting machine.

As shown in FIG. 1, an optical element in the form of a focussing lens 1 in a laser cutting machine is supported in conventional fashion in a lens holder 2. One surface of the focussing lens 1 seats on an annular shoulder 3 of the lens holder 2; on the other side, the focussing lens 1 is secured by a threaded retaining ring 4.

The convex surface 5 of the focussing lens 1, disposed upwardly in FIG. 1, is at one end of a cylindrical cavity 6 in the lens holder 2. This cylindrical cavity 6 is part of a nitrogen filled beam positioning chamber of the partially shown laser cutting machine. In FIG. 1 a laser beam 7 emanating from a laser resonator (not shown) is indicated as impinging on the focussing lens 1.

The circumferential wall of the cylindrical cavity 6 encompasses an end face 8 of the annular shoulder 3 as well as the inner wall of a circular nozzle ring 9. The latter encloses the surface 5 of the focussing lens 1 and its lower surface seats tightly on the annular shoulder 3 of the lens holder 2. The tight fit of the nozzle ring 9 on the annular shoulder 3 is ensured by clamping screws 10 which press down on the other end of the nozzle ring 9 axially opposite the annular shoulder 3 through the retaining ring 11.

Radially positioned outside the nozzle ring 9 is a circular channel 12 milled into the lens holder 2. The circular channel 12 extends around the entire circumference of the nozzle ring 9 and is connected to an external source of nitrogen gas in the form of a nitrogen gas pump 13 whose output gas pressure is adjustable. An O-ring 14, seated in a corresponding groove in the lens holder 2, seals the nozzle ring 9 against the lens holder 2. The nitrogen gas pump 13 is connected by the machine controller 15 to a monitoring device 16 that serves to monitor the internal pressure in the gas filled beam positioning chamber of the laser cutting machine.

Figure 2:
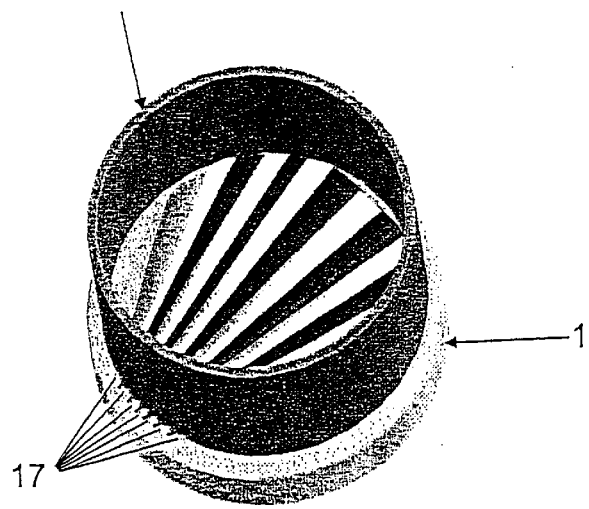
FIG. 2 is a diagrammatic illustration of the gas flow pattern along the surface of the focussing lens in FIG. 1 after it exits from the ducts of the nozzle ring.

As can be best seen in FIG. 2, the nozzle ring 9 is provided with nozzle ducts 17 over only a portion of the perimeter of the surface 5 of the focussing lens 1. These mutually juxtaposed ducts open toward the surface 5 of the focussing lens 1 and serve to carry the scavenging medium, in the form of nitrogen gas supplied by the nitrogen gas pump 13 through the circular channel 12 to purge the surface 5.

Figure 3:
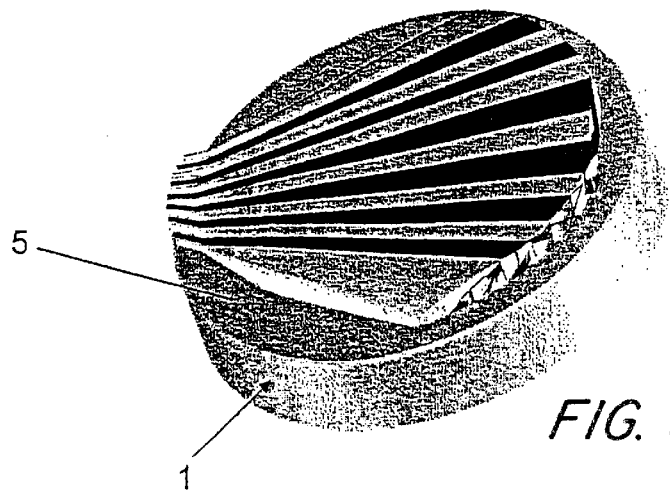
FIG. 3 is a similar diagrammatic view of the gas flow with the nozzle ring rewound.

The nozzle ducts 17 are produced by drilling and have a circular cross section. As indicated in FIG. 1, they are inclined relative to the horizontal plane and are oriented tangentially toward the center of the surface 5 of the focussing lens 1. Their cross sectional duct areas are identical. FIGS. 2 and 3 show that the nozzle ducts 17 follow diverging lines in the direction of the gas flow and the extended diverging lines form a fan shaped pattern along the surface 5 of the focussing lens 1.

The nitrogen gas to be applied to the surface 5 of the focussing lens 1 fills the circular channel 12 outside the nozzle ring 9 at a pressure of about 2.0 bar (29 psi). The internal pressure in the cylindrical cavity 6 in the lens holder 2 is that of the gas filled beam positioning chamber of the laser cutting machine which is slightly above atmospheric pressure.

Due to the pressure differential between the two sides of the wall of the nozzle ring 9 the nitrogen gas will flow from the circular channel 12 at the speed of sound into the cylindrical cavity 6 within the nozzle ring 9. Immediately at the exits of the nozzle ducts 17 opening toward the surface of the focussing lens 1, the partial nitrogen gas flow volumes passing through these duct openings expand in an initially conical pattern. As a result, and also due to the incline of the annular shoulder 3 toward the focussing lens 1 as shown in FIG. 1, in conjunction with the inclination of the nozzle ducts 17 relative to the horizontal plane, the nitrogen gas will impinge on the surface 5 of the focussing lens in a radial direction relative to the cylindrical cavity 6 and at a short distance from the circumferential wall of the cylindrical cavity 6. It follows that only an extremely small marginal zone of the surface 5 underneath the mouths of the nozzle ducts 17 is missed by the streams of scavenging gas.

The divergence of the nozzle ducts 17 produces the fan shaped pattern illustrated in FIGS. 2 and 3, which the nitrogen gas flow sweeps across the surface 5 of the focussing lens 1. In FIG. 3, the recombination of the partial flow volumes exiting from the individual nozzle ducts 17 can be seen. The nitrogen gas flow produced by the recombination of these partial flow volumes moves across the surface 5 of the focussing lens 1 in the form of a large sheet traveling at a relatively high speed.

Since the exits or mouths of the nozzle ducts 17 open on the side of the nozzle ring facing the surface 5 of the focussing lens 1 and are located within a small angle segment of the nozzle ring 9, these exits or mouths of the nozzle ducts 17, viewed in the direction of the flow, are essentially at one level or in one plane notwithstanding the cylindrical curvature of the nozzle ring. As a result, the partial nitrogen gas flow volumes exiting from the individual nozzle ducts 17 will be travelling at an approximately uniform speed at the point of their recombination. This prevents any undesirable turbulence in the gas flow. Since the nitrogen gas is delivered from only one side on the perimeter of the surface 5 of the focussing lens 1, the nitrogen gas flow pattern on the surface 5 remains essentially free of any counter flow.

The composite result of the above features is a nitrogen gas flow on the surface 5 of the focussing lens 1 that is capable of keeping the surface 5 of the focussing lens 1, and especially its zones that are exposed to the laser beam 7, clear of any beam absorbing deposits, and of removing such deposits, as the case may be.

Figure 4:
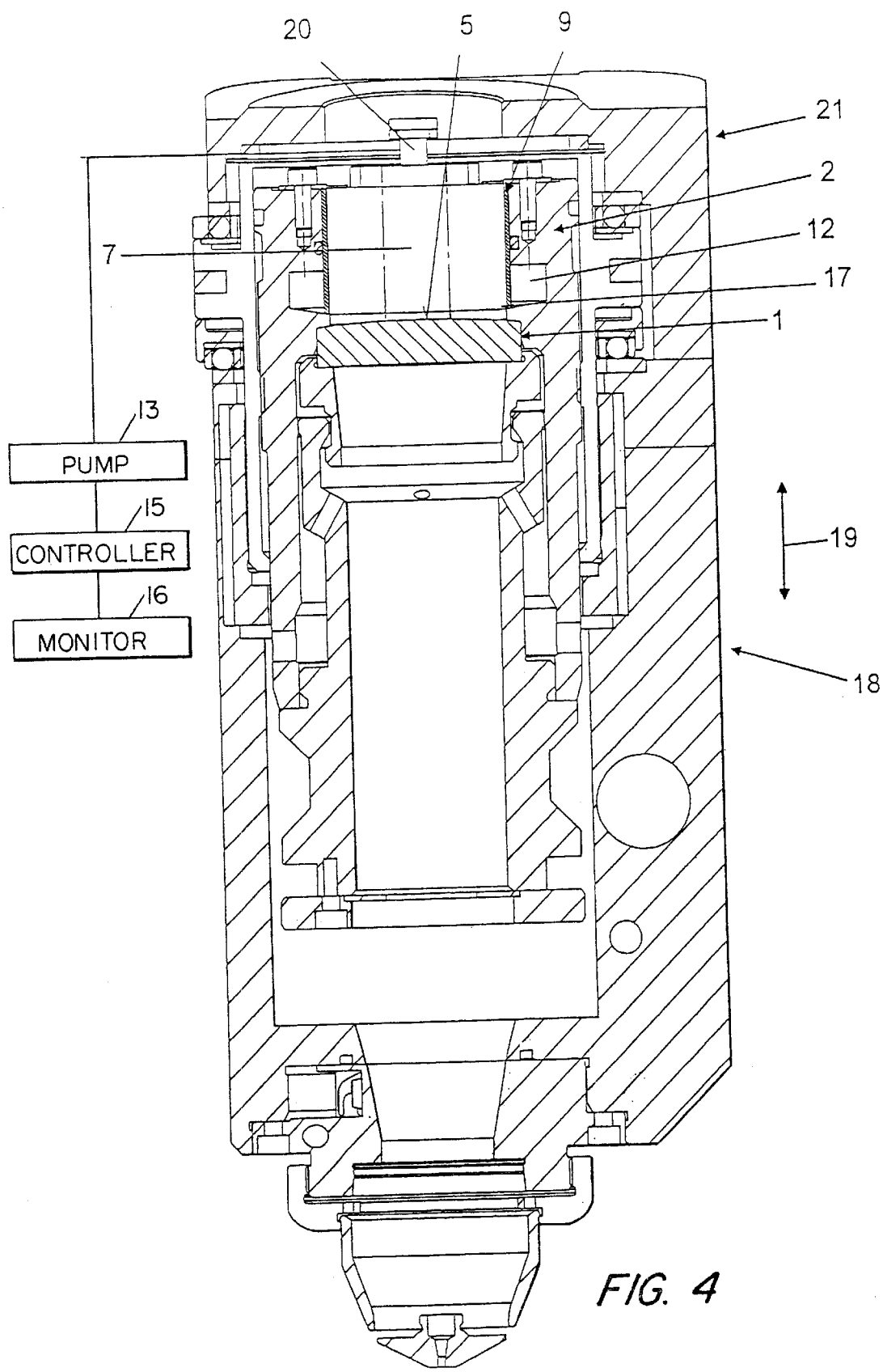
FIG. 4 shows the assembly of FIG. 1 integrated into the cutting head of a laser cutting machine.

As shown in FIG. 4, the lens holder 2 supporting the focussing lens 1 in the cutting head 18 of a laser cutting machine is movable in the direction of the double arrow 19. This positional variability of the focussing lens 1 has traditionally permitted the adjustment of the focus of the laser beam 7 on the workpiece to be processed. The circular channel 12 on the outside of the nozzle ring 9 is connected to the nitrogen gas pump 13 by a tube 20, outlined in FIG. 4, that is mounted on an enclosure 21 of the cutting head 18. Independently of the position of the circular channel 12 in the direction of the double arrow 19, the tube 20 extends into the circular channel 12 and establishes the connection between the nitrogen gas pump 13 and the circular channel 12 regardless of any focal adjustments.

Figure 5:
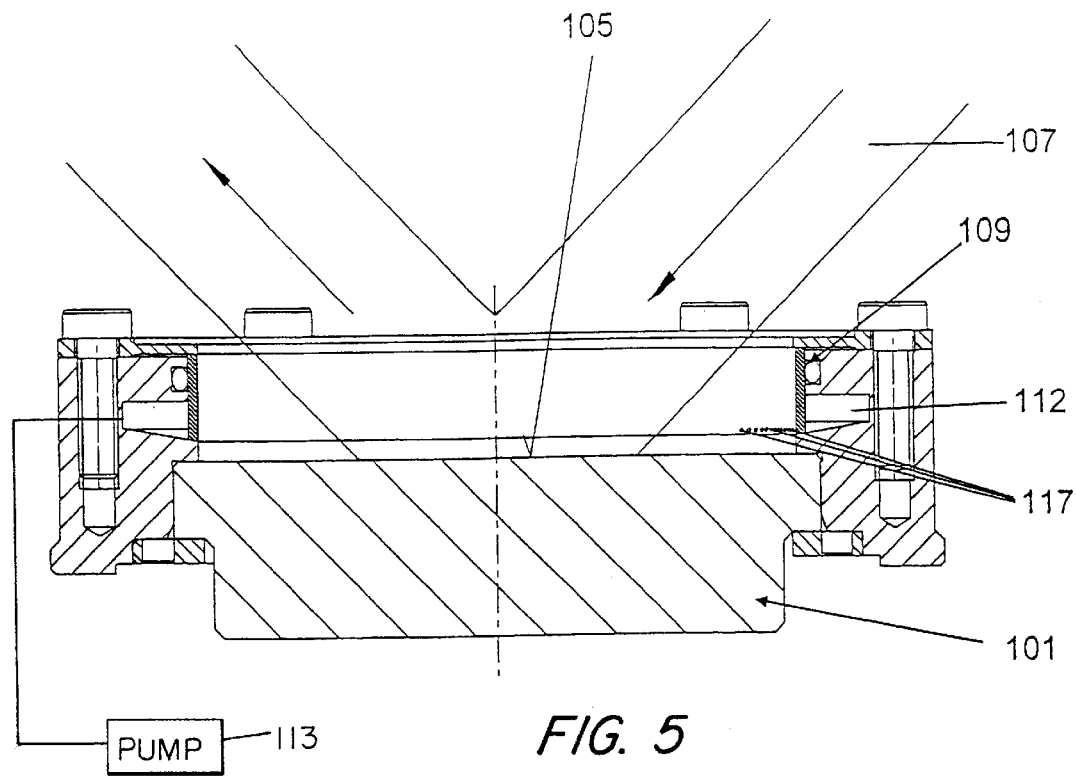
FIG. 5 depicts a scavenger purgeable surface mirror in a mirror mount, which serves to redirect the laser beam in a laser cutting machine.

As indicated in FIG. 5, an optical element in the form of a deflecting surface mirror 101 serving to redirect the laser beam 107 is purgeable with nitrogen gas as the scavenging medium. Corresponding to the design features of the system shown in FIGS. 1 to 4, the flushing of the deflecting mirror 101 involves the delivery of the scavenger medium to the object surface 105 from a nitrogen gas pump 113 by the circular channel 112 and nozzle ducts 117 on a nozzle ring 109 which serves as the enclosure for the surface 105. Other than that, and especially with regard to the positioning and alignment of the nozzle ducts 117 and to the flow pattern on the surface 105, the above descriptions referring to FIGS. 1 to 4 apply here as well.

Figure 6:
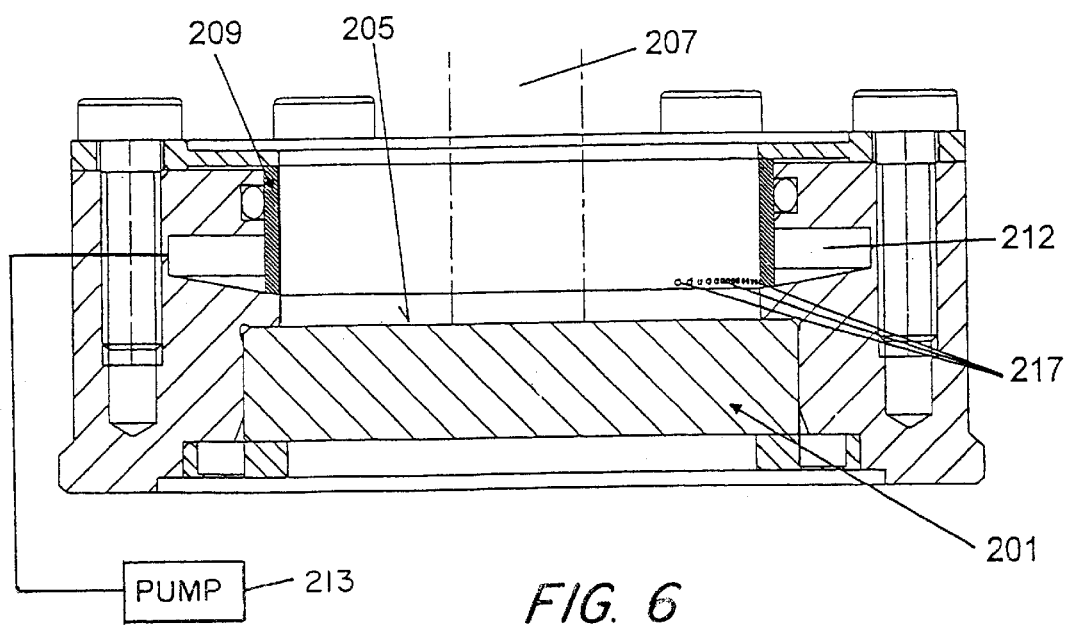
FIG. 6 illustrates a scavenger purgeable coupling mirror in a mirror mount in the laser resonator of a laser cutting machine.

Similarly, reference can be made to the above explanations in describing the architecture and function of the system in FIG. 6. In the latter, the optical element is a coupling mirror 201 of the type traditionally mounted in a laser resonator, or laser cavity, in a laser-based processing machine for discharging a generated laser beam 207.

The object to be protected from, or cleared of, dirt deposits is a surface 205 which for that purpose is flushed with a scavenger gas emanating from an external nitrogen gas pump 213 and fed by a circular channel 212 and nozzle ducts 217 to a nozzle ring 209 that encloses the surface 205. Deviating from the conditions described above, the nozzle ducts 217 have a different cross sectional shape.

In the case of all of the examples shown, the scavenging medium may also be used for replenishing any gas that has leaked out of the beam positioning chamber. In the case of the system illustrated by FIGS. 1 to 4, the internal pressure in the beam positioning chamber is monitored by means of the device 16. In the event of an undesirable pressure drop, the device 16 sends a signal to the machine controller 15 which then causes the nitrogen gas pump 13 to increase the pressure of the delivered gas by a corresponding amount. This pressure increase results in the injection of scavenger gas into the beam positioning chamber of the laser cutting machine in an amount which is sufficient to make up for the detected leakage losses.

Having thus described the invention, what is claimed is:

1. In a laser based processing machine incorporating in the path of the laser beam (7, 107, 207) at least one optical element (1, 101, 201), a scavenging subassembly operative to flush at least one surface (5, 105, 205) of said optical element (1,101,201) situated in the path of the laser beam (7, 107, 207) with a scavenging medium, said scavenging subassembly including a scavenger delivery device having a multiplicity of openings therein located about a limited portion of said optical element and a conduit for said scavenging medium to said openings, said scavenger delivery device openings being designed as an array of nozzles with ducts (17, 117, 217) which are mutually juxtaposed along the perimeter of the optical element (1, 101, 201) and open outwardly toward the surface (5, 105, 205) to be flushed, said openings in said device delivering the scavenging medium to flush the surface of the optical element while essentially avoiding counter flow of the scavenging medium so that the surface (5, 105, 205) of the optical element (1, 101, 201) is flushed by the scavenger medium essentially free of any counter flow.

2. The laser based processing machine in accordance with claim 1, in which said scavenger delivery device has a flow capacity that permits the passage of the volume of the scavenging medium necessary for flushing the corresponding surface (5, 105, 205) of the optical element (1, 101, 201), and is positioned at the perimeter of the surface (5, 105, 205) of the optical element (1, 101, 201) to be flushed, said flow volume of the scavenger delivery device extending over said portion of said surface (5, 105, 205) to be flushed.

3. The laser based processing machine in accordance with claim 1, wherein said optical element having a scavenger-purgeable surface (5, 105, 205) is a focussing lens (1).

4. The laser based processing machine in accordance with claim 1, in which said nozzle ducts (17, 117, 217) of the nozzle array diverge in the flow direction to create in an extended flow direction a fan shaped flow pattern across the surface (5, 105, 205) to be flushed.

5. The laser based processing machine in accordance with claim 4, in which, viewed in the flow direction, the mouths of the nozzle ducts (17, 117, 217) positioned at the perimeter of the surface (5, 105, 205) to be flushed are situated at essentially the same level relative to the surface (5, 105, 205).

6. The laser based processing machine in accordance with claim 1, in which said nozzle ducts (217) have non-uniform cross sections with respect to their shape and/or size.

7. The laser based processing machine in accordance with claim 1, wherein said nozzle ducts (17, 117, 217) have a circular cross section.

8. The laser based processing machine in accordance with claim 1, wherein said nozzle ducts (17, 117, 217) of the nozzle array are provided on an enclosure (9, 109, 209) for these optical elements, (1, 101, 201) encircling the surface (5, 105, 205) to be flushed.

9. The laser based processing machine in accordance with claim 1, in which the surface (5, 105, 205) to be flushed is positioned in a gas filled positioning chamber for the laser beam (7, 107, 207) and the scavenging medium employed is a gas of the type with which the beam positioning chamber is normally filled.

10. The laser based processing machine in accordance with claim 9, wherein there is included a device for regulating the pressure of the scavenging medium and a device (16) for monitoring the internal pressure of the gas filled beam positioning chamber and wherein said monitoring device (16) is connected to and controls said device serving to regulate the pressure of the scavenging medium.

11. The laser based processing machine in accordance with claim 1, wherein said optical element having a scavenger-purgeable surface (5, 105, 205) is a coupling mirror (201) in the laser resonator.

12. The laser based processing machine in accordance with claim 1, wherein said optical element having a scavenger-purgeable surface (5, 105, 205) is a deflecting surface mirror (101).

13. In a laser based processing machine incorporating in the path of the laser beam (7, 107, 207) at least one optical element (1, 101, 201), a scavenging subassembly operative to flush at least one surface (5, 105, 205) of said optical element (1,101,201) situated in the path of the laser beam (7, 107, 207) with a scavenging medium, said scavenging subassembly including a scavenger delivery device having a multiplicity of openings therein located about a limited portion of said optical element and a conduit for said scavenging medium to said openings, said openings in said device delivering the scavenging medium to flush the surface of the optical element while essentially avoiding counter flow of the scavenging medium so that the surface (5, 105, 205) of the optical element (1, 101, 201) is flushed by the scavenger medium essentially free of any counter flow, the surface (5, 105, 205) to be flushed being positioned in a gas filled positioning chamber for the laser beam (7, 107, 207) and the scavenging medium employed is a gas of the type with which the beam positioning chamber is normally filled, said processing machine including a device for regulating the pressure of the scavenging medium and a device (16) for monitoring the internal pressure of the gas filled beam positioning chamber and wherein said monitoring device (16) is connected to and controls said device serving to regulate the pressure of the scavenging medium.

\* \* \* \* \*